United States Patent [19]

Derrick et al.

[11] Patent Number: 4,575,421

[45] Date of Patent: Mar. 11, 1986

[54] NON-CLOGGING WEAR-REDUCING SCREEN ASSEMBLY FOR VIBRATING SCREENING MACHINE

[75] Inventors: James W. Derrick, East Aurora; Robert G. Derrick, Glenwood, both of N.Y.

[73] Assignee: Derrick Manufacturing Corporation, Buffalo, N.Y.

[21] Appl. No.: 587,613

[22] Filed: Mar. 8, 1984

[51] Int. Cl.$^4$ ............................................. B07B 1/49
[52] U.S. Cl. ................................... 209/397; 209/405; 55/514
[58] Field of Search ............... 209/392, 397, 401, 399, 209/403, 405; 55/514; 210/784, 785, 388, 384

[56] References Cited

U.S. PATENT DOCUMENTS

| | | | |
|---|---|---|---|
| 1,716,758 | 6/1929 | Bland | 209/392 |
| 2,061,850 | 11/1936 | Roberts | 209/401 |
| 2,723,032 | 11/1955 | Gisler | 209/401 |
| 2,985,303 | 5/1961 | Wright | 209/403 |
| 3,900,628 | 8/1975 | Stewart | 209/399 |
| 4,033,865 | 7/1977 | Derrick, Jr. | 209/275 |
| 4,040,951 | 8/1977 | Cole | 209/399 |
| 4,380,494 | 4/1983 | Wilson | 209/403 |
| 4,420,391 | 12/1983 | Sharki | 209/399 |
| 4,457,839 | 7/1984 | Bailey | 209/403 |

*Primary Examiner*—Bernard Nozick
*Attorney, Agent, or Firm*—Joseph P. Gastel

[57] ABSTRACT

A non-clogging and wear-reducing screen assembly for a vibrating screening machine including a substantially rigid plate having upper and lower sides and having first and second pairs of opposite edges, attachment members formed integrally with a plate on a first pair of opposite edges for attachment to a vibrating screening machine, a plurality of spaced openings throughout the substantially rigid plate and extending in both directions between the first and second pairs of the opposite edges, borders on the plate surrounding the openings, a supporting screen on the upper side of the plate, first and second superimposed contiguous abutting screens overlying the supporting screen, and adhesive firmly securing the supporting screen and the first and second screens to the borders of the openings.

19 Claims, 8 Drawing Figures

U.S. Patent  Mar. 11, 1986  4,575,421
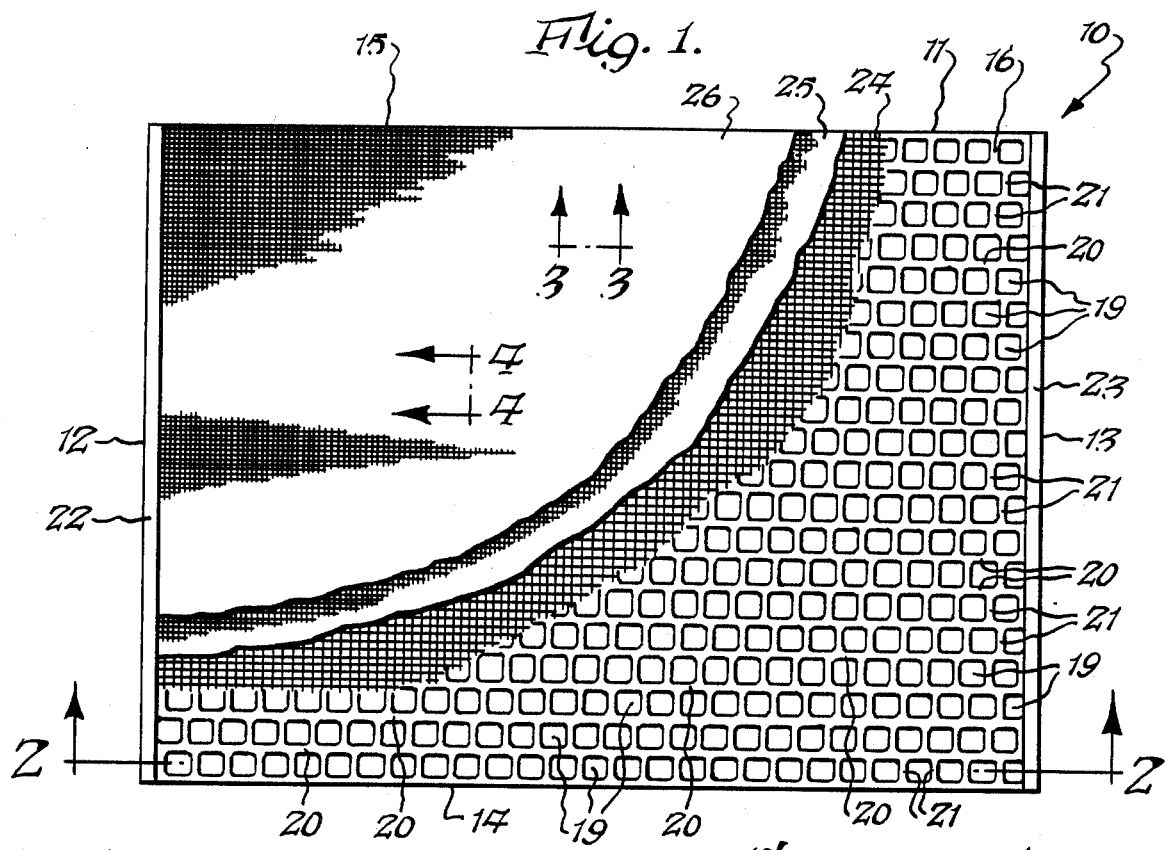
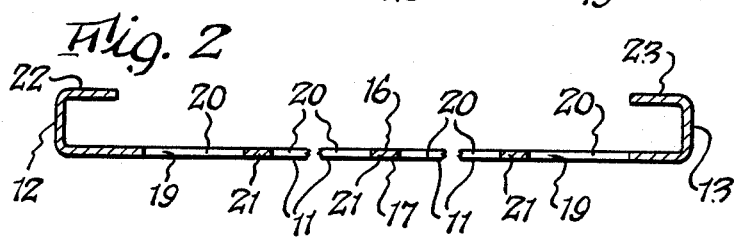
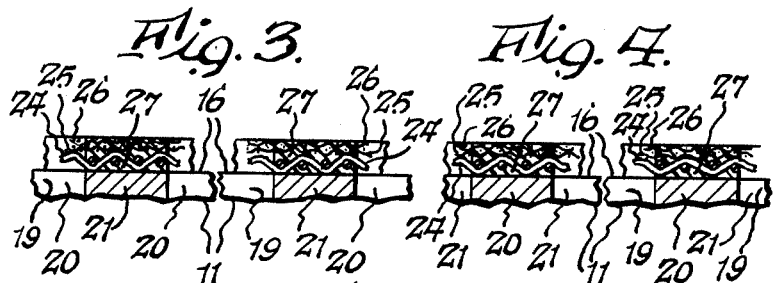
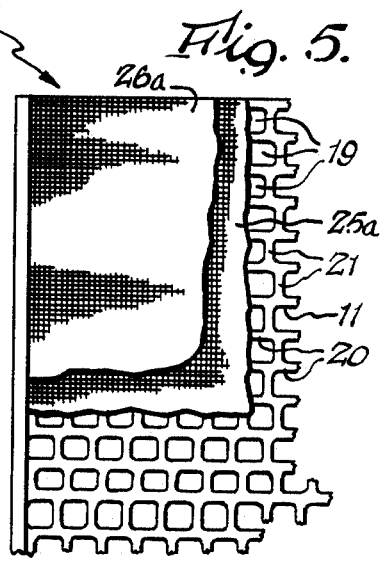
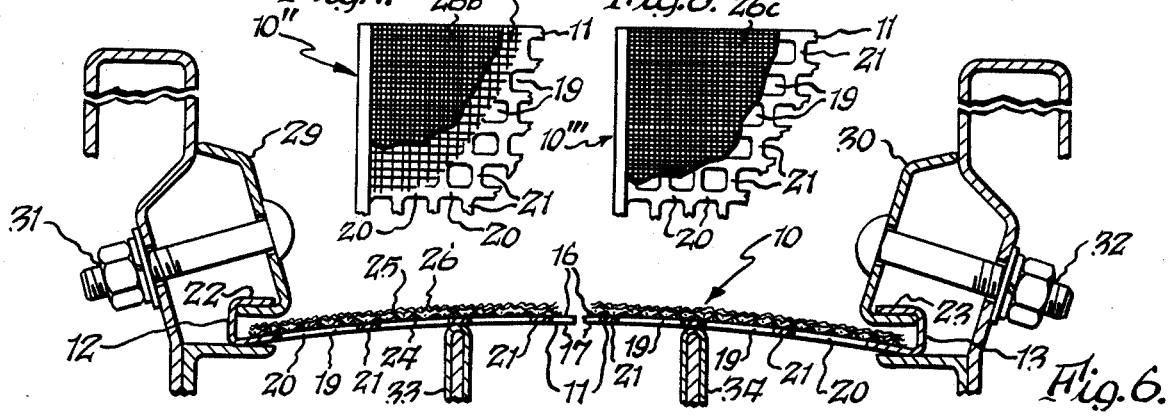

NON-CLOGGING WEAR-REDUCING SCREEN ASSEMBLY FOR VIBRATING SCREENING MACHINE

BACKGROUND OF THE INVENTION

The present invention relates to improved non-clogging and wear-reducing screen assemblies for a vibrating screening machine.

By way of background, in U.S. Pat. No. 4,033,865 a screen assembly for a vibrating screening machine is disclosed which consists of a pair of superimposed contiguous abutting screens mounted in a frame for the prevention of clogging or blinding. However, when the superimposed screens were mounted in their operative positions in the vibrating screening machine, large spans of screens were unsupported. If high accelerations were applied to the screen assembly, the upper screen wore rapidly because the large amplitude of movements of its large unsupported span produced excessive abrasion with the material being screened, and thus the useful screen life was reduced. Therefore, to avoid this, the acceleration forces were reduced with a corresponding reduction in productivity.

SUMMARY OF THE INVENTION

It is the object of the present invention to provide an improved screen assembly for a vibrating screening machine which utilizes screen arrangements supported in such a manner for the purpose of obviating clogging and which can be subjected to high acceleration forces to provide a high productivity without experiencing rapid wear. Other objects and attendant advantages of the present invention will readily be perceived hereafter.

The present invention relates to a screen assembly for a vibrating screening machine comprising a substantially rigid plate having upper and lower sides and having outer edge portions, a plurality of spaced openings in said subtantially rigid plate extending in both directions between said outer edge portions, border portions on said plate surrounding said openings, first and second superimposed screens on said upper side and extending across said openings, and securing means firmly securing portions of said first and second screens surrounding said openings to said border portions.

The present invention also relates to a screen assembly for a vibrating screening machine comprising a substantially rigid plate having upper and lower sides and having outer edge portions, a plurality of spaced openings in said substantially rigid plate extending in a plurality of directions within said outer edge portions, border portions on said plate surrounding said openings, a screen on said upper side extending across said openings, and securing means firmly securing portions of said screen surrounding said openings to said border portions.

The various aspects of the present invention will be more fully understood when the following portions of the specification are read in conjunction with the accompanying drawings wherein:

BRIEF DESCRIPTION OF THE DRAWINGS

FIG. 1 is a plan view of one embodiment of the improved screen assembly of the present invention with portions broken away to show the various layers of the screen;

FIG. 2 is a fragmentary enlarged view taken substantially along line 2—2 of FIG. 1;

FIG. 3 is a greatly enlarged fragmentary cross sectional view taken substantially along line 3—3 of FIG. 1;

FIG. 4 is a greatly enlarged fragmentary cross sectional view taken substantially along line 4—4 of FIG. 1;

FIG. 5 is a fragmentary plan view of another embodiment of the improved screen assembly of the present invention;

FIG. 6 is a fragmentary cross sectional view taken substantially along line 2—2 of FIG. 1 and showing, in addition, portions of the vibrating screening machine which support the screen assembly;

FIG. 7 is a fragmentary plan view of still another embodiment of the present invention; and FIG. 8 is a fragmentary plan view of yet another embodiment of the present invention.

DESCRIPTION OF THE PREFERRED EMBODIMENTS

One embodiment of the non-clogging wear-reducing improved screen assembly 10 of the present invention includes a perforated metal plate 11, such as steel or any other suitable metal, having a first pair of opposite edges 12 and 13 and a second pair of opposite edges 14 and 15 and an upper surface 16 and a lower surface 17. Plate 11 includes openings 19 which are bordered by elongated metal strip-like portions 20 which extend from edge 12 to edge 13 and by staggered shorter strip-like portions 21 which extend lengthwise between edges 14 and 15. The openings 19 are formed by a punching operation and are quadrangles of approximately one inch square with rounded corners, but they may be of any other desired shape or size. The dimensions of openings 19 should not be less than about one-half inch or greater than about four inches, and more preferably not greater than about two and one-half inches and most preferably not greater than about one inch. Strip-like portions 20 and 21 are approximately 1/10 inches wide, but they may be of any desired width. The length of plate 11 between edges 12 and 13 may be approximately four feet and its width between edges 14 and 15 may be approximately 3⅓ feet and it may have a thickness of about 1/16 of an inch. However, it will be appreciated that the size of plate 11 may vary as required to fit different machines. In a plate 11 which is about four feet in length, there will be about 35 openings 19 in each row between edges 12 and 13 when the openings are one inch square. Thus, the width of each opening is a small fraction of the length of the plate between edges 12 and 13. The same is true of the relationship between the height of openings 19 and the width of the plate between edges 14 and 15. Channel-shaped members 22 and 23 are formed integrally with plate 11 at edges 12 and 13, respectively.

A coarse supporting screen 24 extends substantially entirely across upper surface 16. Screen 24 may be of between about 8 and 75 mesh, or any other suitable mesh. A first fine screening screen 25 extends over the entire coarse screen 24 and is in contiguous abutting relationship therewith. A second fine screening screen 26 extends across the entire upper surface of fine screen 25 and is in contiguous abutting relationship therewith. Coarse screen 24 is basically a support for the portions of screens 25 and 26 which overlie openings 19. Screens 24, 25 and 26 are secured to the elongated border portions 20 and 21 and to each other and by epoxy adhesive 27. However, other suitable adhesives or methods of bonding may be used. Thus, the borders of the portions of screens 24, 25 and 26 overlying each opening 19 are firmly adhesively secured to the border portions formed by elongated strip-like portions 20 and 21. Screening screens 25 and 26 may be between 80 and 400 mesh, and preferably central screen 25 has openings which are approximately 20% larger than the openings of top screen 26 so that any particle passing through screen 26 will pass through screen 25. The border portions 20 and 21 can be seen through the screens when the screen assembly is viewed in plan, as in FIG. 1. However, this has been omitted from the drawings for ease of illustration.

Screen assembly 10 is mounted in a vibrating screening machine by means of elongated channel-shaped draw bars 29 and 30 which engage channels 22 and 23 as shown in FIG. 6 and are drawn up by means of nut and bolt assemblies 31 and 32, respectively, as is well known in the art. Screen assembly 10 rests on a frame (not shown) having a plurality of elongated members 33 and 34 extending parallel to channels 12 and 13 and supported at their opposite ends on the frame member. In its operative position screen assembly 10 is bowed slightly so that its center along a line parallel to edges 12 and 13 is higher than the outer edges 12 and 13, as is well known. Screen assembly 10 may also be inclined downwardly from upper edge 15 to lower edge 14 or it may be horizontal, as is well known. Material to be screened is fed onto screen assembly 10 at edge 15 and passes toward edge 14 as screen assembly 10 is vibrated in the conventional manner. As noted above, border portions 21 are staggered. The reason for this is that since the material to be screened is fed onto screen assembly 10 at edge 15 and moves toward lower edge 14, the staggering will prevent the material being screened from following the border portions 21 without passing over openings 19.

As discussed briefly above, in U.S. Pat. No. 4,033,865, the concept is disclosed of utilizing superimposed contiguous abutting screens for the purpose of obviating blinding or clogging of a screen assembly. The theory is that the adjacent superimposed contiguous abutting screens will move laterally and vertically relative to each other during operation and will thus obviate the blinding or clogging. However, in all types of screens, including those of the foregoing type, the amplitude of screen movement varies to the third power of the unsupported span, and if the amplitude is too large, the loading of the material being screened on the upper screen becomes excessive with normal acceleration forces, and thus causes the upper screen to be excessively abraded by the material being screened, thereby causing the screen to wear out rapidly. Accordingly, to remedy the rapid wear-out in the past, the accelerations of prior types of screens were reduced and thus the productivity was also reduced.

By utilizing the above-described construction wherein the only unsupported portions of the screens lie between the border portions 20 and 21, the large amplitudes causing excessive abrasion have been reduced, thereby increasing the life of screen assembly 10. In other words, the unsupported spans of screens were reduced from approximately four feet between edges 12 and 13 to approximately the one-inch dimension of openings 19 in machines which did not have stringers such as 33 of FIG. 6, and the unsupported span was reduced from four inches to the one-inch dimension in machines such as shown in FIG. 6 where stringers 33 were four inches apart. Furthermore, the acceleration applied to screen assembly 10 by the vibrating screening machine could be increased because of the shorter spans of the screens 26 and 25. Since screen productivity increases exponentially with small increases in acceleration forces, and since the abovedescribed shortened spans permits the screen assembly 10 to be subjected to increased acceleration forces, screen assembly 10 not only has a longer life, but also provides a net increase in productivity, in spite of the fact that the open area of the screen between edges 12, 13, 14 and 15 is reduced by approximately 15%.

In FIG. 5 another non-clogging wear-reducing embodiment of the present invention is shown. Screen assembly 10' is identical in all respects to screen assembly 10 of FIG. 1, but does not have supporting screen 24. Screen 10' includes a plate 11, which may be identical in all respects to plate 11 of FIG. 1, with screens 25a and 26b adhesively secured thereto in the above-described manner. Screens 25a and 26a may be identical in all respects to screens 25 and 26 of FIG. 1.

As discussed above, there are two aspects to the present invention which are incorporated into the embodiments of FIGS. 1 and 5. The first aspect is the use of two superimposed fine screens to eliminate blinding or clogging. The second aspect is to reduce the unsupported spans of the screens so as to reduce wear.

The embodiments of FIGS. 7 and 8 are concerned only with reducing screen wear, and are contemplated for use in situations where blinding or clogging is not a problem. In the embodiments of FIGS. 7 and 8 the essential feature is the use of only a single screen having small unsupported spans because it is firmly attached to the border portions of the relatively small openings of the substantially rigid plate.

In its more specific respects, screen assembly 10" of FIG. 7 includes a substantially rigid plate 11 which may be identical in all respects to plate 11 of FIG. 1. It also includes a coarse supporting screen 24b, which may be identical in all respects to supporting screen 24 of FIG. 1. It also includes a fine screen 26b, which may be identical in all respects to fine screen 26 of FIG. 1. Screens 24b and 26b are adhesively secured to border portions 20 and 21 of plate 19 as described above relative to FIGS. 1–4. In this embodiment, supporting screen 24b is used where fine screen 26b requires additional support.

In its more specific aspects, screening assembly 10''' of FIG. 8 includes a substantially rigid plate which may be identical in all respects to plate 11 of FIG. 1 and which includes openings 19 and border portions 20 and 21. A screen 26c may be identical in all respects to screen 26 of FIG. 1, and it is secured to border portions 19 and 20 in the same manner as described above relative to FIGS. 1–4. A single screen 26c, without a supporting screen, such as 24 of FIG. 1, can be used under certain circumstances where support is not necessary.

While the screen assemblies of FIGS. 1, 5, 7 and 8 are shown as being of rectangular shape between their outer edges, it will be appreciated that they may be of any other outer shape, such as round. Furthermore, while specific structure for clamping a screen such as disclosed in the drawings into a specific type of screening machine has been shown in FIG. 6, it will be understood that screens of various shapes made in accordance with the present invention may be mounted by other types of clamping arrangements on other types of screening machines. For example, circular screens can be clamped by their edges and the center of the circular screen can be biased upwardly to form a somewhat conical configuration. Various other types of clamping arrangements and bindings normally utilized in the art may also be employed.

It can thus be seen that the improved screen assembly of the present invention is manifestly capable of achieving the above enumerated objects, and while preferred embodiments of the present invention have been disclosed, it will be appreciated that it is not limited thereto, but may be otherwise embodied within the scope of the following claims.

What is claimed is:

1. A screen assembly for a vibrating screening machine comprising a substantially rigid plate having upper and lower sides and having outer edge portions, a plurality of spaced openings in said substantially rigid plate extending in both directions between said outer edge portions, said spaced openings being relatively small as compared to the size of said plate, border portions on said plate surrounding said openings, first and second superimposed screening screens on said upper side and extending across said openings, adhesive means firmly bonding portions of said first and second screening screens surrounding said openings to said border portions, and channel means at opposite sides of said rigid plate for attaching said rigid plate to a vibratory screening machine.

2. A screen assembly for a vibrating screening machine as set forth in claim 1 wherein said channel means comprise channels formed integrally with said substantially rigid plate.

3. A screen assembly for a vibrating screening machine as set forth in claim 1 wherein said second screening screen is interposed between said first screening screen and said plate, and wherein said second screening screen has openings which are approximately 20% larger than the openings of said first screening screen.

4. A screen assembly for a vibrating screening machine as set forth in claim 1 wherein said border portions comprise first strip-like members extending generally lengthwise in a first direction and second strip-like members extending generally lengthwise in a second direction transverse to said first direction, said second strip-like members including portions which are staggered relative to each other.

5. A screen assembly for a vibrating screening machine as set forth in claim 4 wherein said openings are in the form of quadrangles.

6. A screen assembly for a vibrating screening machine as set forth in claim 4 wherein said channel means comprise channels formed integrally with said substantially rigid plate.

7. A screen assembly for a vibrating screening machine as set forth in claim 1 wherein said first and second screening screens have a mesh number of between about 80 and 400.

8. A screen assembly for a vibrating screening machine as set forth in claim 7 wherein said adhesive means is epoxy.

9. A screen assembly for a vibrating screening machine as set forth in claim 1 including a supporting screen of larger mesh than said first and second screening screens firmly bonded to said border portions on said upper side and located between said upper side and said first and second screens.

10. A screen assembly for a vibrating screening machine as set forth in claim 9 wherein said first and second screening screens have a mesh size of between about 80 and 400.

11. A screen assembly for a vibrating screening machine as set forth in claim 9 wherein said adhesive means is epoxy adhesive.

12. A screen assembly for a vibrating screening machine as set forth in claim 9 wherein said second screening screen is interposed between said first screening screen and said plate and wherein said second screening screen has openings which are approximately 20% larger than the openings of the first screening screen.

13. A screen assembly for a vibrating screening machine as set forth in claim 4 wherein said channel means comprise channels formed integrally with said substantially rigid plate.

14. A screen assembly for a vibrating screening machine as set forth in claim 9 wherein said border portions comprise first strip-like members extending generally lengthwise in a first direction and second strip-like members extending generally lengthwise in a second direction transverse to said first direction, said second strip-like members including portions which are staggered relative to each other.

15. A screen assembly for a vibrating screening machine as set forth in claim 14 wherein said openings are in the form of quadrangles.

16. A screen assembly for a vibrating screening machine as set forth in claim 15 wherein said openings are approximately one inch square.

17. A screen assembly for a vibrating screening machine comprising a plate having upper and lower sides and having outer edge portions, a plurality of spaced openings in said plate extending in a plurality of directions within said outer edge portions, said spaced openings being relatively small as compared to the size of said plate, border portions on said plate surrounding said openings, a first screening screen on said upper side extending across said openings, adhesive means firmly bonding portions of said first screening screen surrounding said openings to said border portions, a second screening screen of larger mesh than said first screening screen interposed between said first screening screen and said plate and bonded by said adhesive to said plate on the border portions of said plate surrounding said openings, and channel means at opposite sides of said rigid plate for attaching said rigid plate to a vibratory screening machine.

18. A screen assembly for a vibrating screening machine as set forth in claim 17 including a supporting screen bonded between said second screening screen and said plate.

19. A screen assembly for a vibrating screening machine as set forth in claim 17 wherein said border portions comprise first strip-like members extending generally lengthwise in a first direction and second strip-like members extending generally lengthwise in a second direction transverse to said first direction, said second strip-like members including portions which are staggered relative to each other.

* * * * *

UNITED STATES PATENT AND TRADEMARK OFFICE
CERTIFICATE OF CORRECTION

PATENT NO. : 4,575,421
DATED : March 11, 1986
INVENTOR(S) : James W. Derrick et al It is certified that error appears in the above–identified patent and that said Letters Patent are hereby corrected as shown below:

Column 6, line 17 (claim 13), change "4" to --9--.

Signed and Sealed this

Twenty-fourth Day of June 1986

[SEAL]

Attest:

Attesting Officer

DONALD J. QUIGG

Commissioner of Patents and Trademarks